United States Patent
Voegele et al.

(10) Patent No.: US 11,453,276 B2
(45) Date of Patent: Sep. 27, 2022

(54) CO-EXTRUSION SNAP-FIT RETRACTABLE COVER

(71) Applicant: RETRAX HOLDINGS, LLC, Ann Arbor, MI (US)

(72) Inventors: Tyler Alyce Voegele, Grand Forks, ND (US); Steven John Givens, Grand Forks, ND (US); Jonathan Charles Fargo, Grand Forks, ND (US)

(73) Assignee: RETRAX HOLDINGS, LLC, Ann Arbor, MI (US)

( * ) Notice: Subject to any disclaimer, the term of this patent is extended or adjusted under 35 U.S.C. 154(b) by 0 days.

(21) Appl. No.: 17/235,379

(22) Filed: Apr. 20, 2021

(65) Prior Publication Data

US 2021/0237548 A1 Aug. 5, 2021

Related U.S. Application Data (63) Continuation of application No. 16/691,838, filed on Nov. 22, 2019, now Pat. No. 11,014,435.

(51) Int. Cl.
*B60J 7/14* (2006.01)
*B60J 7/19* (2006.01)

(52) U.S. Cl.
CPC .............. *B60J 7/141* (2013.01); *B60J 7/198* (2013.01)

(58) Field of Classification Search
CPC ....... B60J 7/14; B60J 7/141; B60J 7/19; B60J 7/198; B60P 7/02
USPC ............. 296/100.01, 100.02, 100.06, 100.09
See application file for complete search history.

(56) References Cited

U.S. PATENT DOCUMENTS

| | | | |
|---|---|---|---|
| 4,313,636 A | 2/1982 | Deeds | |
| 9,211,834 B2 | 12/2015 | Facchinello et al. | |
| 9,895,963 B1 | 2/2018 | Spencer | |
| 9,925,853 B2 * | 3/2018 | Aubrey | B60P 7/02 |
| 10,300,775 B2 | 5/2019 | Spencer | |
| 10,414,257 B2 | 9/2019 | Facchinello | |
| 10,471,814 B1 | 11/2019 | Weng | |
| 10,525,803 B2 * | 1/2020 | Hutchens, III | B32B 15/10 |
| 2013/0093206 A1 * | 4/2013 | Rusher | B60J 7/085 |
| | | | 296/100.14 |
| 2015/0061315 A1 | 3/2015 | Facchinello et al. | |
| 2016/0031305 A1 | 2/2016 | Bernardo | |
| 2016/0288691 A1 | 10/2016 | Aubrey | |

FOREIGN PATENT DOCUMENTS

GB 2522367 A * 7/2015 ............ B60J 10/277

OTHER PUBLICATIONS

Diamondback 270 (as exisited on May 21, 2019); located at https://diamondbackcovers.com/products/diamondback27o?variant=28904543817; retreived via Internet Archive wayback Machine (Year: 2019).

* cited by examiner

*Primary Examiner* — Jason S Daniels
(74) *Attorney, Agent, or Firm* — The Dobrusin Law Firm, P.C.; Bryan S. Lemanski (57) ABSTRACT

A tonneau cover comprising: (a) one or more panels pivotally connected to one or more additional panels via hinge portions; and (b) hinges having a plurality of engaging features, the hinges being positioned within the hinge portions so that the plurality of engaging features are secured within channels of the panels to connect the panels, the hinges further including a fin that projects from the hinges and seals a gap between the connected panels.

20 Claims, 4 Drawing Sheets

CO-EXTRUSION SNAP-FIT RETRACTABLE COVER

FIELD

The present teachings generally relate to a tonneau cover, and more specifically, to a retractable tonneau cover having a plurality of co-extruded snap-fit panels.

BACKGROUND

Tonneau covers are typically used to cover and protect a cargo bed or unoccupied portion of a vehicle from environmental degradation. Typical tonneau covers include a plurality of interconnected panels that make up the tonneau cover. The tonneau cover is frequently secured to a cargo box of the vehicle, thereby preventing moisture, debris, unwanted objects, or a combination thereof from entering the cargo box or unoccupied portion and damaging cargo or the vehicle itself. The tonneau cover may include a rigid frame design, such that when fully assembled and attached to the vehicle, the frame creates a unitary structure. The tonneau cover may also include one or more movable portions so that the cover may be retracted by rolling or folding the tonneau cover onto itself to uncover at least a portion of the cargo box or unoccupied portion.

It may often be desirable to easily open and close a cover to access the cargo box or unoccupied portion of a vehicle. Therefore, the interconnected panels of the tonneau cover may often pivot and/or flex relative to each other so that the tonneau cover may be retracted to access the cargo box or unoccupied portion of the vehicle and/or extended to cover the cargo box or unoccupied portion of the vehicle. As a result, the interconnected panels may pivot, fold, or both relative to each other to allow for the tonneau cover to retract and extend. However, the interconnected panels may often include an exposed gap or seam between the panels to allow for movement of the panels relative to each other. The exposed gaps and seams may thus create an access point for moisture, debris, or both to enter an interior of the tonneau cover and/or the cargo box of the vehicle. The moisture, debris, or both may then degrade and/or damage the tonneau cover, the cargo box, or both.

Examples of tonneau systems may be found in U.S. Pat. Nos. 4,313,636; 9,211,834; 9,895,963; and 10,300,775; and US Publication Nos. 2015/0061315, all of which are incorporated herein for all purposes. It would be attractive to have a tonneau cover that protects a cargo box of a vehicle and may incrementally retract to expose all or a portion of the cargo box. What is needed is a tonneau cover having a plurality of panels that are pivotally engaged. It would be attractive to have a tonneau cover that prevents moisture, debris, or both from entering the inner workings of the tonneau cover, from entering the cargo box, or both. What is needed is a tonneau cover that includes one or more seals that seal gaps, seams, or both of the tonneau cover. It would be attractive to have a modular tonneau cover that is customizable based on a desired vehicle. What is needed is a tonneau cover that includes a plurality of panels that are interconnected to either pivotally engage one another, to substantially prevent movement of the panels relative to one another, or both.

SUMMARY

The present teachings meet one or more of the present needs by providing a tonneau cover comprising: (a) one or more panels pivotally connected to one or more additional panels via hinge portions; and (b) hinges having a plurality of engaging features, the hinges being positioned within the hinge portions so that the plurality of engaging features are secured within channels of the panels to connect the panels, the hinges further including a fin that projects from the hinges and seals a gap between the connected panels.

The present teachings meet one or more of the present needs by providing a tonneau cover comprising: (a) a plurality of panels, the plurality of panels being interconnected by: (1) one or more hinge portions, wherein the one or more hinge portions each include a hinge having a plurality of engaging features secured within channels of the plurality of panels to pivotally connect the plurality of panels, and the hinge prevents moisture and debris from entering the hinge portion; and (2) one or more connecting portions that substantially prevent pivoting of the plurality of panels once connected; wherein a first portion of the plurality of panels are interconnected by the one or more hinge portions and a second portion of the plurality of panels are interconnected by the one or more connecting portions.

The present teachings meet one or more of the present needs by providing a tonneau cover, wherein: the hinges include an opening and the hinges flex to pivot the connected panels about an axis of the opening; a terminal end of the fin is substantially flush with an outer surface of the connected panels; the hinges prevent moisture and debris from entering the gap between the connected panels; the hinges and the connected panels are co-extruded; the tonneau cover further comprises connecting portions connecting one or more panels to one or more additional panels, wherein the connecting portions substantially prevent pivoting of the connected panels relative to each other; a male portion of a first connected panel is received by a female portion of a second connected panel to form a connecting portion; the connected panels connected by the hinge portion are secured to one another along abutting edges, and the connected panels are connected to additional panels along edges opposing the abutting edges by the connecting portions; the male portion and the female portion include projections that interconnect and secure the male portion within the female portion; the female portion includes a divot that receives a contoured surface of the male portion so that the male portion is properly positioned within the female portion to secure the male portion within the female portion; the connecting portions include a seal secured within a slot of at least one of the connected panels to prevent moisture and debris from entering the connecting portions; the seal is substantially flush with an outer surface of the connected panels; each panel at least partially forms a connecting portion along a first end and at least partially forms a hinge portion along an opposing second end; the tonneau cover is disposed over a cargo box of a vehicle, and the panels extend between, and are secured to, opposing sidewalls of the cargo box; or a combination thereof.

The present teachings meet one or more of the present needs by providing a tonneau cover, wherein: the hinge includes a fin that projects from the hinge and seals a gap of the hinge portion formed between the plurality of panels, and a terminal end of the fin is substantially flush with an outer surface of the plurality of panels; the hinge includes an opening and the hinge flexes to pivot the connected panels about an axis of the opening; each of the plurality of panels is connected to a first additional panel by the hinge portion and a second additional panel by the connecting portion; the one or more connecting portions are formed by a female portion of at least one of the plurality of panels receiving and securing a male portion of at least one other panel of the plurality of panels; the female portion includes a divot that receives a contoured surface of the male portion so that the male portion is properly positioned within the female portion to secure the male portion within the female portion, and the one or more connecting portions include a seal secured within a slot of connecting portion between the panels to prevent moisture and debris from entering the connecting portion; or a combination thereof.

The present teachings meet one or more of the present needs by providing: a tonneau cover that protects a cargo box of a vehicle and may incrementally retract to expose all or a portion of the cargo box; a tonneau cover having a plurality of panels that are pivotally engaged; a tonneau cover that prevents moisture, debris, or both from entering the inner workings of the tonneau cover, from entering the cargo box, or both; a tonneau cover that includes one or more seals that seal gaps, seams, or both of the tonneau cover; a modular tonneau cover that is customizable based on a desired vehicle; a tonneau cover that includes a plurality of panels that are interconnected to either pivotally engage one another, to substantially prevent movement of the panels relative to one another, or both; or a combination thereof.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein generally relate to a tonneau cover that may secure to a cargo bed or unoccupied portion of a vehicle (i.e., a portion of the vehicle adjacent to or outside of a passenger cabin)(hereinafter referred to as "cargo box"). The tonneau cover may attach to a cargo box of a pickup truck. The cargo box may consist of one or more sidewalls, one or more tailgates, or both. The one or more sidewalls, one or more tailgates, or both may include one or more mating surfaces. For example, the sidewalls may include a vertical lip substantially perpendicular to the ground and configured to engage one or more attaching mechanisms of the tonneau cover. The tonneau cover may consist of a plurality of tonneau sections. The tonneau sections may be interlocked such that one or more of the tonneau sections are adapted to roll and/or fold onto one or more additional tonneau sections (i.e., a retractable tonneau system). For example, the tonneau sections may be connected by one or more hinge assemblies so that the tonneau sections may fold and/or roll onto one another by pivoting hinges of the hinge assemblies. The tonneau sections may be connected using a plurality of side members, crossmembers, panels, retainers, or a combination thereof. Each tonneau section may include one or more side members, one or more crossmembers, or both. The one or more side members, one or more crossmembers, or both may connect to the cargo box using one or more mounting assemblies of the tonneau cover. For example, the tonneau sections may span between opposing mounting assemblies that are secured to opposing sidewalls of a cargo box. The tonneau cover may be unitary (i.e., a single connected piece), or may consist of a plurality of tonneau sections. The tonneau cover may be structurally rigid. For example, the tonneau cover may be sufficiently rigid to prevent an object, such as a heavy stone, from damaging the tonneau cover and entering the cargo box. The tonneau cover may be flexible such that the one or more sections of the tonneau cover are movable while a portion of the tonneau cover remains stationary. The tonneau cover may be sufficiently flexible so that the tonneau cover may be rolled onto itself. The tonneau cover system may comprise a uniform material or may comprise a plurality of materials. For example, the tonneau cover may include metal hinges yet have plastic panels interconnected by the metal hinges.

The tonneau cover may be configured to protect the cargo box or other compartment from environmental degradation. The environmental degradation may be corrosion, rust, mold/mildew, or a combination thereof, caused by precipitation and other environmental elements. The tonneau cover may be attached to the cargo box by one or more mounting assemblies, one or more retaining portions, one or more brackets, one or more side members, or a combination thereof. The tonneau cover may be attached by fasteners, adhesives, or a combination thereof. The fasteners may be screws, bolts, nuts, nails, press-fit clips/buttons, hooks, latches, or a combination thereof. The adhesives may be glue, epoxy, polyurethane, cyanoacrylate, or a combination thereof. However, it is contemplated that the tonneau cover may be movably secured to the cargo box so that the tonneau cover may freely move to retract (i.e., open and expose a portion of the cargo box), close (i.e., cover the cargo box), or both. For example, the tonneau cover may be guided along one or more rails between a retracted position, a closed position, any intermediate position, or a combination thereof. The tonneau cover may be flexible. The tonneau cover may be a continuous piece. For example, the tonneau cover may be a single panel that includes one or more creases to allow for one or more portions of the panel to fold onto one another. The tonneau cover may be structurally rigid such that the cover deflects objects to prevent flexing or piercing of the cover. The tonneau cover may be a fabric, metal, polymer, or a combination thereof. The tonneau cover may comprise a plurality of panels that make up the tonneau cover. For example, the cover may include a plurality of individual panels that, when installed, are connected (e.g., secured together) to form a unitary cover. The tonneau cover may include one or more seams. The tonneau cover may be free of seams. The tonneau cover may removably attach to the cargo box such that the tonneau cover may be easily replaced.

The tonneau cover may include a plurality of panels. The panels may function to prevent moisture or debris from entering the cargo box or other compartment of a vehicle, such as a pickup truck. The panels may function to interconnect between each other to allow the tonneau cover to fold and/or roll onto itself. For example, the panels may be pivotally engaged to one another to form a continuous tonneau cover so that, upon retraction of the tonneau cover, the panels pivot relative to each other to roll onto one another. Alternatively, the panels may be fixedly connected to one another to form a substantially rigid surface. The panels may interconnect to form a seam between the panels. The seams may be sealed to prevent moisture, debris, or both from entering the cargo box. It is contemplated that the seams may prevent moisture, debris, or both from entering the cargo box and the inner workings of the tonneau cover even during retraction and/or extension of tonneau cover (i.e., during folding and/or unfolding of the plurality of panels, rolling and/or unrolling of the plurality of panels onto each other, or both). The panels may extend between opposing sidewalls of the cargo box to form the tonneau cover. The panels may be free of secondary supports that structurally support a weight of the panels. For example, the panels may extend between opposing sidewalls and may be free of supporting crossmembers. Alternatively, or additionally, the panels may include one or more secondary supports.

The panels may be interconnected by one or more hinge portions. The hinge portions may function to pivotally engage connected panels. The hinge portions may allow movement of one or more of the panels of the tonneau cover while the one or more moving panels are still secured to one or more additional panels. The hinge portions may be positioned between panels to connect the panels. The hinge portions may be at least partially formed by one or more portions of the panels being connected. The hinge portions may include one or more movable components that promote movement of the panels. For example, the hinge portions may create an axis of rotation for the connected panels to pivot about. The hinge portions may allow for the one or more panels to rotate a desired amount relative to a connected panel. The one or more panels may rotate about 30 degrees or more, about 60 degrees or more, or about 90 degrees or more relative to a connected panel. The one or more panels may rotate about 180 degrees or less, about 150 degrees or less, or about 120 degrees or less relative to a connected panel. The panels may rotate relative to each other so that the panels may fold substantially onto one another to retract the tonneau cover. The panels may fold onto each other so that abutting surfaces of connected panels may be substantially flush. The hinge portions may form a seam, a gap, or both between panels to allow the panels to rotate relative to other. The hinge portions may be positioned anywhere relative to the panels so that the panels are connected. The hinge portions may be monolithically (i.e., integrally) formed with the panels. The hinge portions may be formed by connecting one or more secondary components to the panels. The hinge portions may abut edges of connected panels to create a substantially unitary cover. The hinge portions may connect all or a portion of the panels of a tonneau cover. For example, the hinge portions may connect a first portion of the panels to allow for movement of the first portion of the panels while a second portion of the panels remains substantially fixed.

The hinge portions may include a hinge. The hinge may function to connect panels to each other. The hinge may function to allow movement of the connected panels relative to each other. The hinge may allow movement of one or more of the connected panels. For example, the hinge may connect a first panel and a second panel, and the hinge may allow the first panel to pivot relative to the second panel, the second panel to pivot relative to the first panel, or both. The hinge may include one or more movable members. For example, the hinge may include a first component with a ball that is received by a socket of a second component so that the first component moves relative to the second component, or vice versa. The hinge may be flexible. The hinge may flex to allow for movement of connected panels. The hinge may create a desired gap between connected panels. The gap may be created so that the panels may pivot relative to each other. The gap may be about 5 mm or more, about 10 mm or more, or about 20 mm or more. The gap may be about 100 mm or less, about 50 mm or less, or about 30 mm or less. The gap may be any distance between terminal edges of connected panels so that one or more of the connected panels may freely pivot in a desired direction. Alternatively, the hinge may position the panels so that edges of the panels abut one another, and the hinge portion is substantially free of a gap between the connected panels.

The hinge may be secured to the panels in any desired fashion. The hinge may be secured to the panels by one or more fasteners, one or more adhesives, or both. The hinge may be at least partially formed with the panels to secure the hinge to the panels. For example, the hinge may be co-extruded with one or more of the panels so that the hinge is formed with the one or more panels. The hinge may be removable from the one or more panels. For example, the hinge may be removable for replacement or repair of the hinge. The hinge may be any desired material. The hinge may be a polymer, rubber, metal, or a combination thereof. The hinge may be any desired size and/or shape. The hinge may extend along one or more edges of the panels. The hinge may have a length substantially similar to a length of one or more edges of the panels. As such, it is contemplated that the hinge may be coextensive with one or more panels.

The hinge may include one or more engaging features. The engaging features may function to secure the hinge to one or more panels. The engaging features may connect to a portion of the panels. The engaging features may project from a portion of the hinge. For example, the engaging features may project from a central body of the hinge into a receiving portion of one or more panels. The engaging features may be a mechanical fastener, such as a push pin, hook, latch, finger, pin, clip, key, or a combination thereof. The engaging features may be flexible, compressible, or both. The engaging features may be rigid. The engaging features may have any desired size and/or shape to secure the hinge to the panels. The engaging features may create a joint with one or more panels after engagement. The joint may be a butt joint, lap joint, tee joint, tongue and groove joint, dovetail joint, biscuit joint, or a combination thereof. The engaging features may connect to one or more panels. For example, a first portion of the engaging features of the hinge may connect to a first panel while a second portion of the engaging features of the hinge may connect to a second panel. The first portion and the second portion of the engaging features may be positioned on opposing halves of the hinge so that a central point of the hinge is positioned between the connected panels. As such, it is contemplated that a central point or midpoint of the hinge may be positioned between the panels so that the panels may rotate about the central point as an axis of rotation.

The engaging features may be received by one or more channels of the panels. The channels may function to secure the engaging features of the hinge and connect the hinge to the panels. The channels may be shaped to receive the engaging features. The channel may be a female portion having a cavity shaped substantially similar to a projecting male engaging feature of the hinge so that the channel receives the engaging feature. The channel may include an opening. The opening may include one or more flanges, one or more shelves, one or more lips, or a combination thereof. The channels may be positioned anywhere along the panels. However, it is contemplated that the channels may be positioned beneath an outer surface of the panels (i.e., a surface exposed to the elements that protects the cargo box and opposes a surface of the panels that faces the cargo box) so that the channels are protected from moisture, debris, or both. The channels may be flexible to receive the engaging features or may be structurally rigid. For example, the channels may be structurally rigid and over-molded around one or more engaging features of the hinge. The channels may include an adhesive or may be free of adhesives. The channels may include an abrasive surface within an interior cavity that mates with engaging features of the hinge to increase friction between the engaging features and the channel.

The hinge may include a fin. The fin may function to seal a gap or seam between connected panels. The fin may extend into the gap or seam between the connected panels to prevent moisture, debris, or both from entering the gap or seam. The fin may extend beyond an outer surface of the connected panels. The fin may be recessed from the outer surface of the connected panels. A portion of the fin may be substantially flush with the outer surface of the connected panels. For example, a terminal end of the fin may be flush with the outer surface of the connected panels to form a substantially planar surface with the connected panels. The fin may project from a body or central portion of the hinge. The fin may be flexible. The fin may be compressible. For example, the fin may be compressible so that, when the fin is positioned within a gap between connected panels, the fin compresses against edges of the panels to create a seal. The fin may be tapered. The fin may have a shape that matches a contour of the gap between the connected panels. For example, the connected panels may have tapered edges and the fin may have a taper that mates with the tapered edges of the connected panels. The fin may be positioned anywhere along the hinge. A base of the fin may be monolithically formed with a body of the hinge so that a terminal end of the fin may substantially align with an outer surface of the connected panels. The fin may include a substantially flat surface at the terminal end so that, when the fin is positioned within the gap between the connected panels, the flat surface of the terminal end is substantially coplanar with an outer surface of the connected panels. The fin may project away from a central opening of the hinge.

The opening may function to allow movement of the hinge. The opening may function to promote flexing of the hinge during movement of the panels. The opening may be positioned near a central potion (e.g., a body) of the hinge. The opening may be a cutout extending through the hinge. The opening may extend through a thickness of the hinge, a length of the hinge, or both. The opening may form a channel in the hinge. The opening may be free of contact with the panels. A center point of the opening may form an axis of rotation for one or more of the connected panels. Therefore, the hinge may flex so that the connected panels may pivot about the axis of the opening. The opening may be fully enclosed along a circumference of the opening. For example, the opening may only be open near terminal ends of the hinge along a length of the hinge. Alternatively, the opening may include an entry along its circumference. The entry may increase in size as the tonneau cover is retracted (i.e., the panels are pivoted), may decrease in size as the tonneau cover is retracted, or both. The entry may increase in size as the tonneau cover is extended (i.e., closed), decrease in size as the tonneau cover is extended, or both. The opening may form an inner cavity within the hinge. The inner cavity may form any desired shape. A contour of the inner cavity may substantially follow a contour along an outer surface of the hinge. The opening may be centrally positioned along an axis of the hinge. Alternatively, the opening may be offset from the axis of the hinge.

A portion of the panels may be interconnected by a hinge portion while another portion of the panels may be interconnected by a connecting portion. The connecting portion may function to fixedly connect the panels. The connecting portion may substantially prevent movement of the panels once connected. As such, it is contemplated that the connecting portion may prevent a pivoting movement of the panels that may be possible along the hinge portions. The connecting portion may removably secure panels to each other. As such, the panels may be disconnected along the connecting portions for configuration of the tonneau cover, replacement of one or more panels, or both. The connecting portion may prevent moisture, debris, or both from entering the connecting portion, entering into the cargo box of the vehicle, or both. The connecting portion may connect the panels so that edges of the connected panels abut one another. As such, the connecting portion may position the connected panels relative to each other to substantially minimize or entirely eliminate a gap between the connected panels. The connecting portion may maintain a position of the connected panels relative to each other during opening and/or closing of the tonneau cover.

It should be noted that one or more panels may at least partially form both a connecting portion and a hinge portion. The panels of the tonneau cover may be connected to a first connected panel via a hinge portion while also connected to a second connected panel via a connecting portion. Therefore, it is contemplated that the panels may be interconnected so that some of the connected panels may pivot relative to other panels of the tonneau cover while other panels may remain substantially stationary relative to the panels of the tonneau cover. The hinge portions and the connecting portions may alternate along seams or gaps between panels along a length of the tonneau cover. The length of the tonneau cover may substantially align with a length of the vehicle—i.e., a distance between a front of a vehicle and the tailgate of the vehicle. Therefore, a panel may include a plurality of channels near a first edge to form a hinge portion while a second opposing edge of the panel may at least partially form a connecting portion.

One or more of the panels may include a female portion to at least partially form the connecting portion. The female portion may function to receive a male portion of one or more panels to create the connecting portion. The female portion may secure the male portion of one or more panels to connect the panels. The female portion may be positioned anywhere along the panels. The female portion may form a recess to receive the male portion. For example, a first panel may include a female portion that secures a male portion of a second panel. The female portion may be positioned near one or more edges of the panels. The female portion may extend beyond one or more edges of the panel. The female portion may project from one or more surfaces of the panels. The female portion may include one or more contoured portions, one or more linear segments, one or more arcuate portions, one or more bends, one or more undulations, or a combination thereof. The female portion may include one or more arms, one or more fingers, or both. The female portion may substantially form a shelf that supports the male portion. The female portion may be at least partially flexible. The female portion may be substantially rigid. The female portion may removably secure the male portion so that the connected panels may be disconnected freely without damaging the panels.

The female portion may include a divot. The divot may function to receive a contoured surface of the male portion. The divot may be an undulation in the female portion. The divot may position the male portion with the female portion so that the male portion is secured within the female portion, and the panels are fixedly connected to each other. The divot may be any desired shape. However, it is contemplated that the divot may include a contour that substantially mates with the contoured surface of the male portion. The divot may maintain a position of the male portion during movement of the tonneau cover so that a gap between connected panels remains substantially constant. The divot may include an abrasive surface. The divot may include one or more adhesives or may be free of adhesives. For example, the divot may include an adhesive so that the male portion is adhered in place once received by the divot.

One or more panels may include a male portion. The male portion may function to at least partially form the connecting portion. The male portion may function to connect panels by inserting the male portion into the female portion of one or more additional panels. The male portion may project from one or more panels to be inserted into a female portion. For example, a first panel may include a male portion that is inserted into a female portion of a second portion. As such, it is contemplated that a panel may include a male portion, a female portion, or both. For example, a panel may include a male portion and/or a female portion near a first edge to at least partially form a connecting portion, and the panel may include one or more channels near a second opposing edge to at least partially form a hinge portion. The male portion may include one or more arcuate portions, one or more linear segments, one or more undulating surfaces, one or more flanges, or a combination thereof. The male portion may include one or more mechanical fasteners such as a hook, clasp, latch, finger, key, pin, or a combination thereof. The male portion may project from a panel at any angle to mate with the female portion. The male portion may be at least partially supported by the female portion.

The male portion may include a contoured surface. The contoured surface may function to position the male portion within a divot of the female portion. The contoured surface may be received by the divot of the female portion so that the male portion is secured within the female portion, and the panels are fixedly connected to each other. The contoured surface may be any desired size and contour. However, it is contemplated that the contoured surface may include a contour that substantially mates with a contour of the divot. The contoured surface may help maintain a position of the male portion relative to the female portion during movement of the tonneau cover so that a gap between connected panels remains substantially constant. The contoured surface may include an abrasive surface.

The male portion may include an abutment. The abutment may function to abut a surface of the female portion. The abutment may function to at least partially prevent rotation of one or more panels connected to each other. For example, the abutment of a male portion of a first panel may extend into the female portion of a second panel so that the first panel is prevented from rotation relative to the second panel. The abutment may project from one or more surfaces of the male portion. The abutment may be a step, flange, arm, shelf, or a combination thereof. The abutment may be positioned substantially flush with a surface of the female portion, a panel, or both. The abutment may maintain a position of the contoured surface of the male portion within the divot of the female portion. The abutment may be any length, size, shape, or a combination thereof. The abutment may contact any part of the female portion. The abutment may be structurally rigid. The abutment may prevent pivoting of a connected panel so that projections of the connected panels may interlock to secure the panels to each other.

The projections may function to connect panels to each other within the connecting portion. The projections may interlock to secure panels to each other and prevent unwanted disconnect of one or more panels. The projections may be located on the female portion, the male portion, or both. For example, the female portion of a first panel and the male portion of a second panel may each include at least one projection, and the projections of the female portion and the male portion may interlock to connect the first panel and the second panel. The projections may extend at any angle relative to the female portion and/or the male portion. The projections may include one or more teeth, a notch, a hook, a finger, a key, or a combination thereof. The projections may include one or more holes (e.g., a keyhole), slots, channels, or a combination thereof. For example, a projection of a male portion may include a key that is received by a keyhole slot of a projection of a female portion. The projections may releasably connect to each other. The projections may be flexible or may be rigid. The projections may be monolithically formed with the female portion, the male portion, or both. The projections may be positioned anywhere along the male portions, the female portions, or both. The projections of connected panels may interconnect to prevent movement of the connected panels relative to each other, disconnection of the connected panels, or both.

The connecting portion may further include a seal. The seal may function to prevent moisture, debris, or both from entering the connecting portion, the cargo box through the connecting portion, or both. The seal may be positioned within a gap or seam between connected panels within the connecting portion. The seal may abut connected panels to substantially seal a gap or seam between the connected panels. The seal may be compressible. For example, the seal may be compressible so that, when the seal is positioned within a gap between connected panels, the seal compresses against edges of the panels to create a seal. The seal may extend beyond an outer surface of the connected panels. The seal may be recessed from the outer surface of the connected panels. A portion of the seal may be substantially flush with the outer surface of the connected panels. For example, a terminal end of the seal may be flush with the outer surface of the connected panels to form a substantially planar surface with the connected panels. The seal may be flexible. The seal may have a shape that matches a contour of the gap between the connected panels. For example, the connected panels may have tapered edges and the seal may have a taper that mates with the tapered edges of the connected panels. The seal may be positioned anywhere along the connecting portion. A base of the seal may be monolithically formed with one or more of the connected panels. The seal may include a substantially flat surface at the terminal end so that, when the seal is positioned with the gap between the connected panels, the flat surface of the terminal end is substantially coplanar with an outer surface of the connected panels.

The seal may be secured within a slot of one or more of the connected panels along the connecting portion. The slot may function to secure the seal to the one or more connected panels. The slot may be configured to receive a portion of the seal so that the seal remains secured to the panel. For example, the slot may include one or more flanges to receive one or more complimentary flanges of the seal. The slot may include one or more channels to receive the seal. The slot may include a "T" shaped channel, a "C" shaped channel, a "U" shaped channel, a "V" shaped channel, a "G" shaped channel, or a combination thereof. The seal may be configured so that a width of the seal is greater than a width of a channel opening so that the seal, once positioned inside the channel of the slot, rests along one or more portions of the channel. The slot may be structurally rigid. For example, the seal may be inserted into the slot from a proximal end, a distal end, or both, and moved along a longitudinal axis (i.e., an axis substantially parallel to one or more sidewalls of the cargo box) to a desired location. The slot may be flexible so that an opening of the slot may be expanded to insert the seal and retracted once the seal is positioned inside the slot. The slot may extend along a length of the engaging portion or the slot may have a length shorter than a length of the engaging portion.

Figure 1:
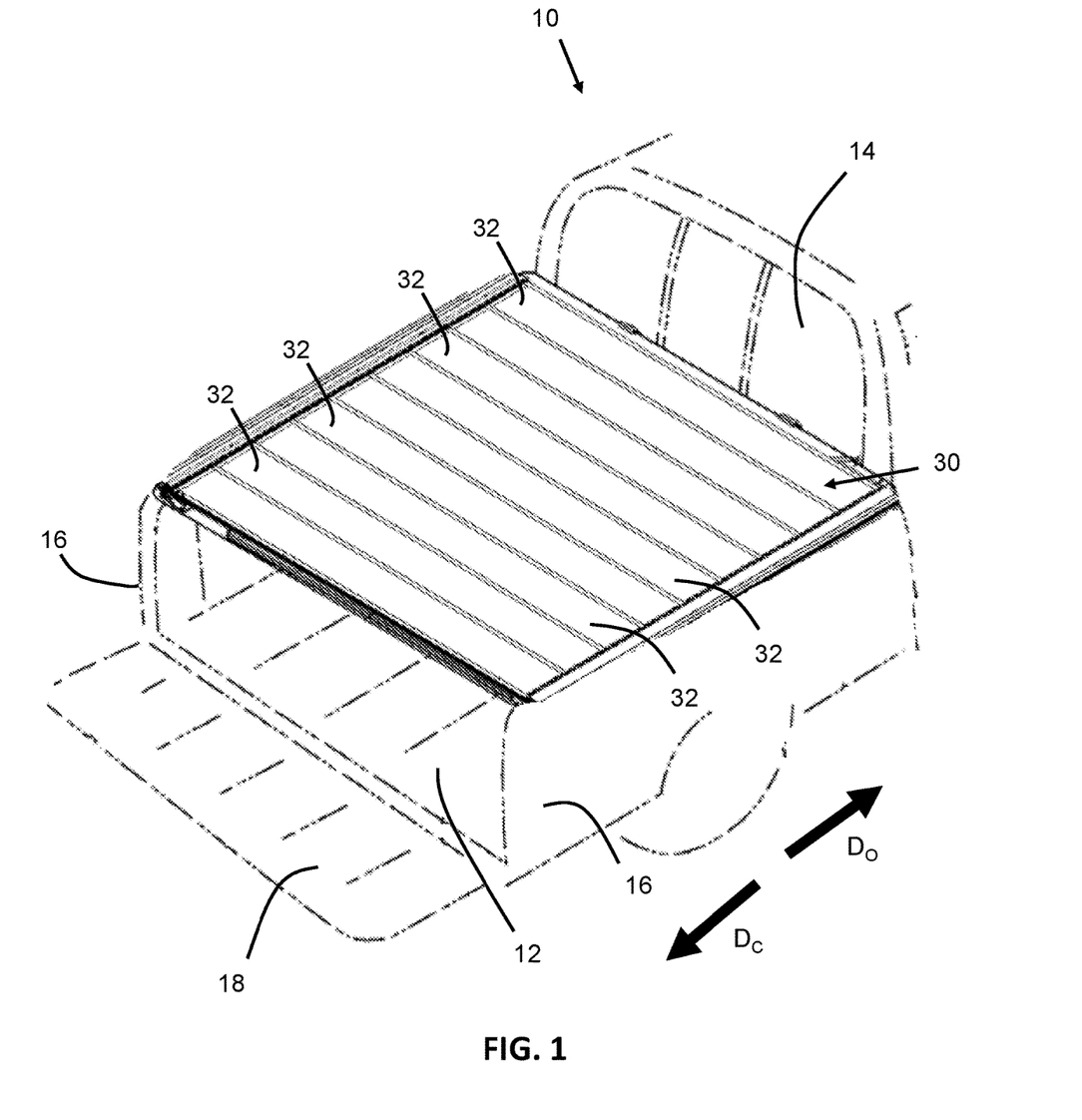
FIG. 1 is a perspective view of a tonneau cover secured to a cargo box of a vehicle.

Turning now to the figures, FIG. 1 illustrates a perspective view of a vehicle 10. The vehicle 10 includes a cargo box 12 and a passenger cabin 14. The cargo box 12 includes a front wall (not shown), a pair of opposing sidewalls 16, and a tailgate 18. As illustrated, the sidewalls 16 are substantially symmetrically opposite to each other. The vehicle 12 further includes a tonneau cover 30 disposed over the cargo box 12 and secured to the opposing sidewalls 16. The tonneau cover 30 includes a plurality of panels 32 interconnected. The panels 32 may be pivotally connected to each other, fixedly connected to each other, or both (see FIGS. 2-6). The tonneau cover 30 may be configured so that the panels 32 may fold and/or roll onto each other in direction ($D_o$), thereby allowing a user to access the cargo bed 12 (i.e., when the tonneau cover 30 is in an open position). The panels 32 may then be unfolded to cover the cargo bed 12 in an opposing direction ($D_c$) (i.e., a closed position).

Figure 2:
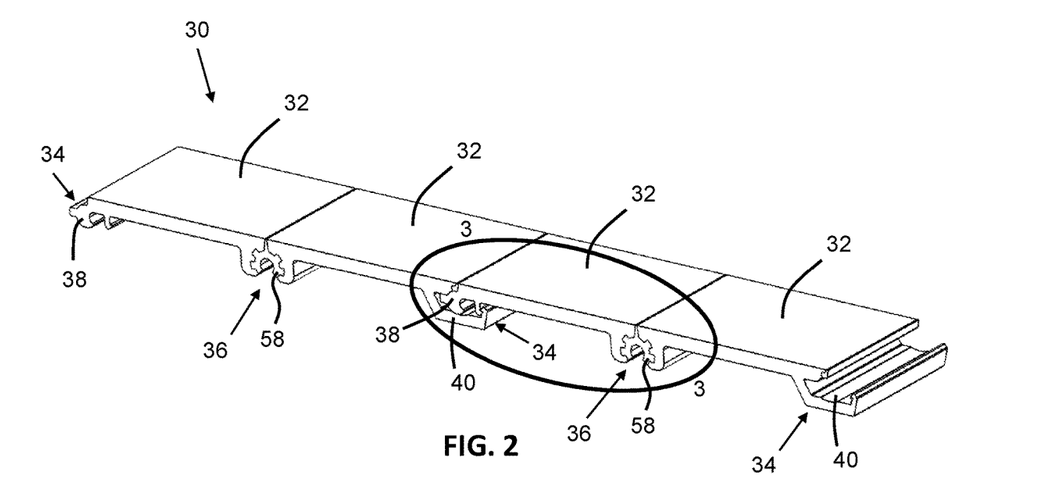
FIG. 2 is a perspective view of a partial tonneau cover.

FIG. 2 illustrates a partial perspective view of a tonneau cover 30. The tonneau cover 30 includes a plurality of interconnected panels 32. The panels 32 may be interconnected and pivotally engaged to each other about a hinge portion 36 having a movable hinge 58 secured to the panels 32. Alternatively, or additionally, the panels 32 may be interconnected via a connecting portion 34. One or more panels 32 may include a male portion 38 that is received by a female portion 40 of one or more additional panels 32 to form the connecting portions 34.

Figure 3:
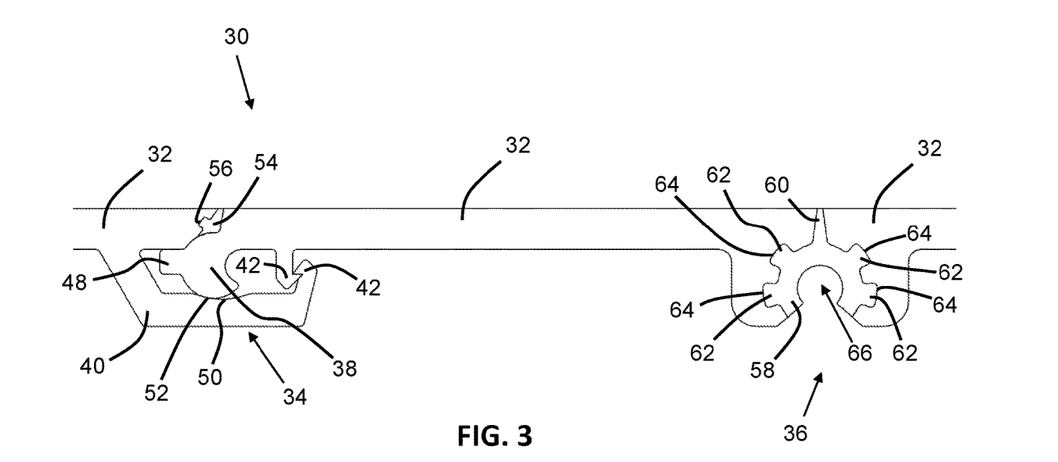
FIG. 3 is a close-up side view of the partial tonneau cover of FIG. 2.

FIG. 3 is close-up view 3 of the partial tonneau cover 30 of FIG. 2. The tonneau cover 30 includes a plurality of interconnected panels 32. The panels 32 may be connected along one or more hinge portions 36 so that the panels 32 may pivot relative to each other. The hinge portions 36 may include a hinge 58 having a plurality of engaging features 62 secured within channels 64 of the panels 32. The hinge 58 may further include an opening 66 so that, once the hinge 58 connects two or more panels 32, the hinge 58 may be flexed so that the panels 32 may pivot substantially about an axis of the opening 66. The hinge 58 may also include a fin 60 configured to fill a gap between the connected panels 32 (see FIG. 5). While one or more panels 32 may be movably connected by a hinge portion 36, one or more panels 32 may also be substantially fixedly connected by a connecting portion 34. The connecting portion 34 may include a male portion 38 of a panel 32 secured within a female portion 40 of another panel 32. The male portion 38 may include an abutment 48 that abuts a surface of the female portion 40. The male portion 38 may further include a contoured surface 52 that rests within a divot 50 of the female portion 40. Once the contoured surface 52 is positioned within the divot 50, projections 42 of the female portion 40 and the male portion 38 may interlock to create a substantially fixed connection. Additionally, a seal 54 may be secured within a slot 56 of one of the panels 32 to seal a seam between the panels 32 formed by the connecting portion 34.

Figure 4:
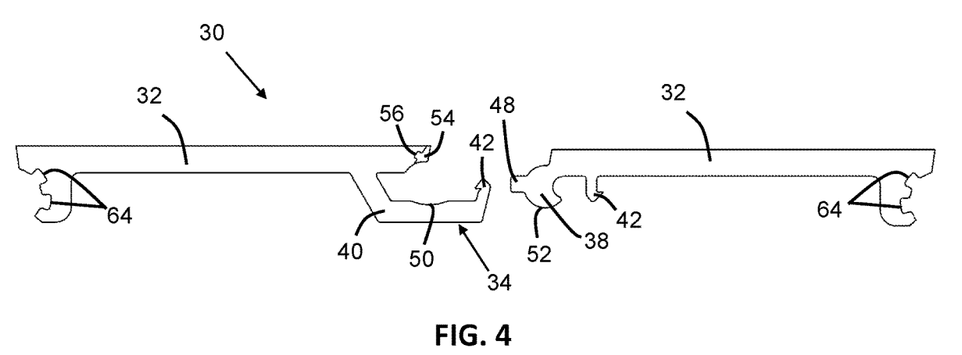
FIG. 4 is a partial exploded view of a connecting portion of a tonneau cover.

FIG. 4 illustrates a partial exploded view of a connecting portion 34 of a tonneau cover 30. The tonneau cover 30 includes a plurality of interconnected panels 32. One or more panels may include a male portion 38 that is received by a female portion 40 of one or more additional panels 32 to form the connecting portion 34. It is contemplated that the connecting portion 34 may fixedly secure the panels 32 to each other to substantially prevent movement of the panels 32 relative to one another. The male portion 38 may include an abutment 48 that abuts a surface of the female portion 40. The male portion 38 may further include a contoured surface 52 that rests within a divot 50 of the female portion 40. Once the contoured surface 52 is positioned within the divot 50, projections 42 of the female portion 40 and the male portion 38 may interlock to create a substantially fixed connection. Additionally, a seal 54 may be secured within a slot 56 of one of the panels 32 to seal a seam between the panels 32 formed by the connecting portion 34. One or more panels may further include a plurality of channels 64 configured to receive a portion of a hinge so that one or more panels 32 may be pivotally engaged to each other about an axis of the hinge (see FIG. 5).

Figure 5:
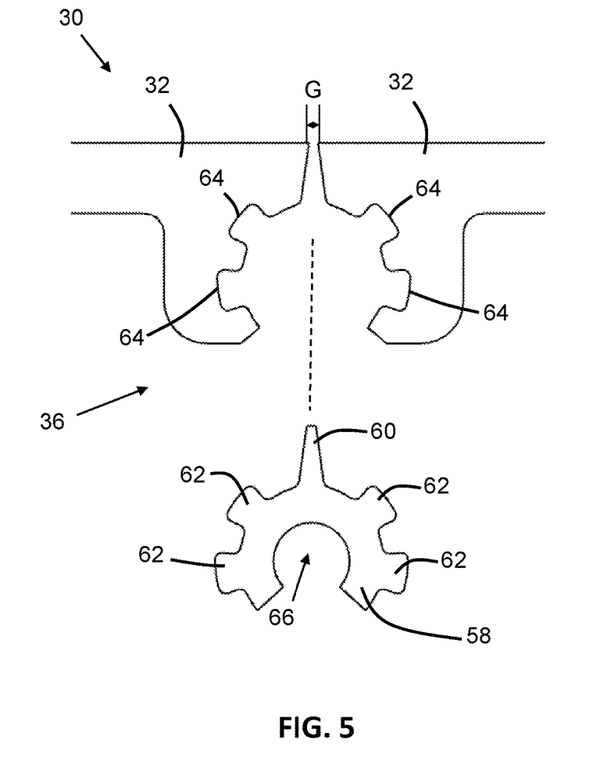
FIG. 5 is a close-up exploded view of a hinge portion of a tonneau cover.

FIG. 5 illustrates an exploded view of a hinge portion 36 of a tonneau cover 30. The tonneau cover 30 includes a plurality of interconnected panels 32. The panels 32 may be connected along the hinge portion 36 so that the panels 32 may pivot relative to each other. The hinge portion 36 may include a hinge 58 having a plurality of engaging features 62. The engaging features 62 may be secured within channels 64 of the panels 32 to pivotally connect the panels 32. The hinge 58 may further include an opening 66 so that, once the hinge 58 connects the panels 32, the hinge 58 may be flexed so that the panels 32 may pivot substantially about an axis of the opening 66. The hinge 58 may also include a fin 60 configured to fill a gap (G) between the connected panels 32.

Figure 6:
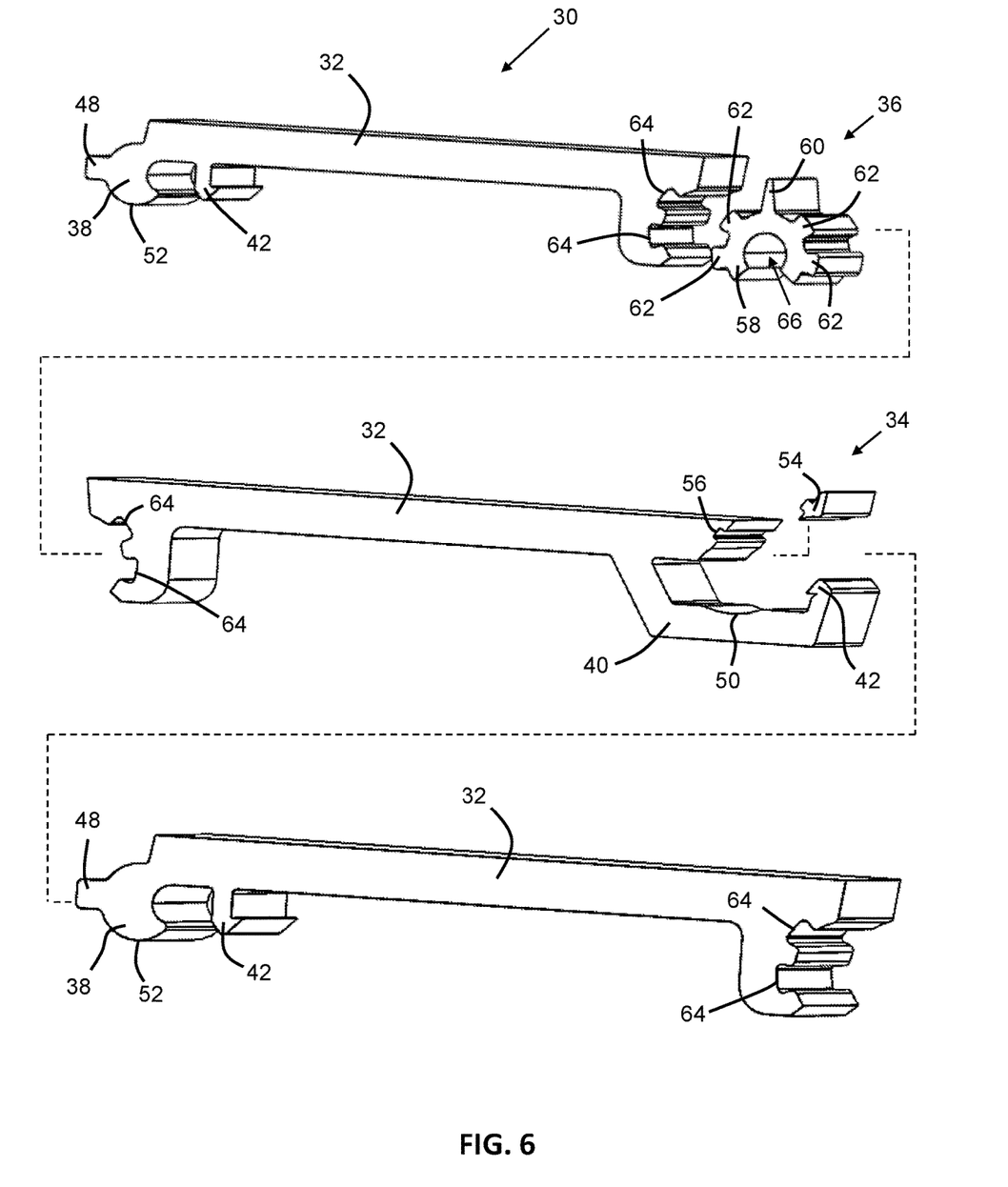
FIG. 6 is an exploded view of a partial tonneau cover.

FIG. 6 illustrates an exploded view of a partial tonneau cover 30. The tonneau cover 30 includes a plurality of interconnected panels 32. The panels 32 may be connected along one or more hinge portions 36 so that the panels 32 may pivot relative to each other. The hinge portions 36 may include a hinge 58 having a plurality of engaging features 62 secured within channels 64 of the panels 32 to pivotally connect the panels 32. The hinge 58 may further include an opening 66 so that, once the hinge 58 connects two or more panels 32, the hinge 58 may be flexed so that the panels 32 may pivot substantially about an axis of the opening 66. The hinge 58 may also include a fin 60 configured to fill a gap between the connected panels 32 (see FIG. 5). While one or more panels 32 may be movably connected by a hinge portion 36, one or more panels 32 may also be substantially fixedly connected by a connecting portion 34. The connecting portion may include a male portion 38 of a panel 32 secured within a female portion 40 of another panel 32. The male portion 38 may include an abutment 48 that abuts a surface of the female portion 40. The male portion 38 may further include a contoured surface 52 that rests within a divot 50 of the female portion 40. Once the contoured surface 52 is positioned within the divot 50, projections 42 of the female portion 40 and the male portion 38 may interlock to create a substantially fixed connection. Additionally, a seal 54 may be secured within a slot 56 of one of the panels 32 to seal a seam between the panels 32 formed by the connecting portion 34

ELEMENT LIST

10 Vehicle
12 Cargo Box
14 Passenger Cabin
16 Sidewall
18 Tailgate
30 Tonneau Cover
32 Panel
34 Connecting Portion
36 Hinge Portion
38 Male Portion
40 Female Portion
42 Projection
48 Abutment
50 Divot
52 Contoured Surface
54 Seal
56 Slot
58 Hinge
60 Fin
62 Engaging Feature
64 Channel
66 Opening
D Direction of Movement of the Tonneau Cover
G Gap Between Panels The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/−15.

The disclosures of all articles and references, including patent applications and publications, are incorporated by reference for all purposes. Other combinations are also possible as will be gleaned from the following claims, which are also hereby incorporated by reference into this written description.

What is claimed is:

1. A tonneau cover comprising: a first panel pivotally connected to a second panel via a hinge portion, wherein the hinge portion includes a hinge having a plurality of engaging features, the hinge being positioned within the hinge portion so that the plurality of engaging features are secured within channels of the first panel and the second panel; and wherein the hinge further includes a fin that projects away from a center axis of an opening of the hinge and seals a gap between the first panel and the second panel.

2. The tonneau cover of claim 1, wherein the hinge flexes to pivot the first panel, the second panel, or both about the center axis of the opening.

3. The tonneau cover of claim 2, wherein the hinge flexes to substantially close the opening of the hinge during retraction of the tonneau cover, folding of the tonneau cover, or both.

4. The tonneau cover of claim 1, wherein a terminal end of the fin is substantially flush with an outer surface of the connected panels.

5. The tonneau cover of claim 4, wherein the terminal end of the fin is a substantially flat surface that is substantially coplanar with the outer surface of the connected panels.

6. The tonneau cover of claim 1, wherein the hinge and the first panel, the second panel, or both are co-extruded.

7. The tonneau cover of claim 1, further comprising a connecting portion connecting the first panel or the second panel to a third panel, wherein the connecting portion substantially prevents pivoting of the first panel or the second panel relative to the third panel, or vice versa.

8. The tonneau cover of claim 1, wherein the tonneau cover is disposed over a cargo box of a vehicle, and the first panel and the second panel extend between, and are secured to, opposing sidewalls of the cargo box.

9. The tonneau cover of claim 1, wherein the fin has a length greater than a length of the plurality of engaging features.

10. The tonneau cover of claim 1, wherein the plurality of engaging features radially project from the center axis of the opening.

11. The tonneau cover of claim 1, wherein the fin is tapered towards a terminal end of the fin.

12. The tonneau cover of claim 11, wherein the fin matches a contour of the gap formed between the first panel and the second panel.

13. The tonneau cover of claim 12, wherein the taper of the fin mates with a tapered edges of the first panel and the second panel.

14. The tonneau cover of claim 13, wherein the fin is flexible, compressible, or both.

15. The tonneau cover of claim 1, wherein the opening is positioned centrally in a body of the hinge and forms a channel in the hinge.

16. The tonneau cover of claim 15, wherein the opening includes an entry along its circumference.

17. The tonneau cover of claim 1, wherein the channels of the first panel and the second panel are positioned beneath an outer surface of the first panel and the second panel to protect the channels from moisture, debris, or both.

18. The tonneau cover of claim 1, wherein a first portion of the plurality of engaging features are secured within the channels of the first panel and a second portion of the plurality of engaging features are secured within the channels of the second panel.

19. The tonneau cover of claim 18, wherein the first portion and the second portion are positioned on opposing sides of the hinge as defined by an axis extending through the fin.

20. The tonneau cover of claim 19, wherein the center axis of the opening is positioned between the first panel and the second panel.

* * * * *